US 6,276,426 B1
Aug. 21, 2001

(54) VEHICLE REAR WINDOW SCREEN

(75) Inventor: Stephen Polak, 1914 Cloverdale Rd., Bethlehem, PA (US) 18018-1420

(73) Assignee: Stephen Polak, Bethlehem, PA (US)

( * ) Notice: Subject to any disclaimer, the term of this patent is extended or adjusted under 35 U.S.C. 154(b) by 0 days.

(21) Appl. No.: 09/677,470

(22) Filed: Oct. 2, 2000

(51) Int. Cl.⁷ ...................................................... B60J 1/18
(52) U.S. Cl. ............................................. 160/90; 160/105
(58) Field of Search .......................... 160/105, 90, 380, 160/370.21, DIG. 2; 296/146.1, 190.1, 190.11

(56) References Cited

U.S. PATENT DOCUMENTS

| | | | |
|---|---|---|---|
| 2,297,729 | * 10/1942 | Thomas | 160/380 |
| 2,343,037 | * 2/1944 | Adelman | 160/380 |
| 2,722,978 | * 11/1955 | Frisk | 160/105 |
| 3,175,603 | * 3/1965 | Tonnon | 160/105 |
| 4,124,054 | * 11/1978 | Spretnjak | 160/90 |
| 4,232,310 | * 11/1980 | Wilson | 160/380 |
| 4,936,368 | * 6/1990 | Philbeck et al. | 160/105 X |
| 5,192,112 | * 3/1993 | Gherardi et al. | 160/90 X |
| 5,469,906 | * 11/1995 | Cason | 160/105 |
| 6,007,899 | * 12/1999 | Yoshizawa et al. | 160/105 X |
| 6,016,861 | * 1/2000 | Davis | 160/105 |

\* cited by examiner

*Primary Examiner*—David M. Purol
(74) *Attorney, Agent, or Firm*—Wendy W. Koba

(57) ABSTRACT

A screen assembly for use in a rear window of a vehicle such as a pick-up truck is formed of a laminate structure including a screen element disposed between a pair of plastic frame members. The structure is glued together to permanently fix the screen between the pair of frames, forming a structure with sufficient strength to withstand the air circulation between a truck bed and cab when a rear window is opened. A screen window track is attached to the exterior of the existing rear window using a double-sided adhesive. In some cases, the screen track may be attached directly to the window using double-sided tape (i.e., attached to the right hand and left hand sides) if the periphery or surface area of the window border is too narrow to support the screen frame.

4 Claims, 1 Drawing Sheet

VEHICLE REAR WINDOW SCREEN

TECHNICAL FIELD

The present invention relates to a rear window screen for a vehicle and, more particularly, to the use of a laminate structure of a plastic frame and screen element as the window.

BACKGROUND OF THE INVENTION

In some vehicles, particularly in cabs of pick-up trucks, a rear window is included that is opened in the lateral direction, such as by sliding one or more window members along a channel. When such windows are opened while in the vehicle is in motion, air will circulate between the truck bed and cab, causing debris, insects, leaves, etc. to enter the cab area of the truck.

There have been numerous attempts in the prior art to solve this problem by including a screen with this rear window. In particular, U.S. Pat. No. 4,936,368 discloses an add-on window screen that is engageable with pre-existing sealing strips on the window system. The add-on screen is removably attached to the vehicle by manual manipulation of the screen such that no screws, adhesives or other means of attachment are required. A problem with this arrangement may arise, however, in that repeated insertions and removals of the window screen may eventually degrade the sealing strips arid, eventually, cause leaks in the window system.

SUMMARY OF THE INVENTION

A need remaining in the prior art is addressed by the present invention, which relates to a rear window screen for a vehicle and, more particularly, to the use of a laminate structure of a plastic frame and screen element as the window.

In accordance with a preferred embodiment of the present invention, a relatively thin plastic material is used as the frame for the screen assembly. A separate screen element is disposed between two frames and pressed together to form a laminate assembly. Preferably, a glue treatment is used to form the laminate, ensuring that the perimeter of the screen element is firmly fixed between the two frames. A window track. formed to extend across an existing rear window structure, is used to support the laminate screen assembly in a slidable arrangement. An adhesive, such as a double-faced tape, is used to attach to upper and lower channels of the screen track to the existing window structure. In a preferred embodiment, the frame of the screen assembly can be colored to match the window frame, thus adding to the appearance of the vehicle.

It is an advantage of the screen assembly of the present invention that the laminate combination of the screen and frame forms a structure of high strength, able to withstand the wind speeds encountered when the vehicle is traveling at high rates of speed. Additionally, the screen assembly and window track can be permanently attached to the existing window structure, eliminating the need to remove the screen to close the window.

Other and further advantages of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
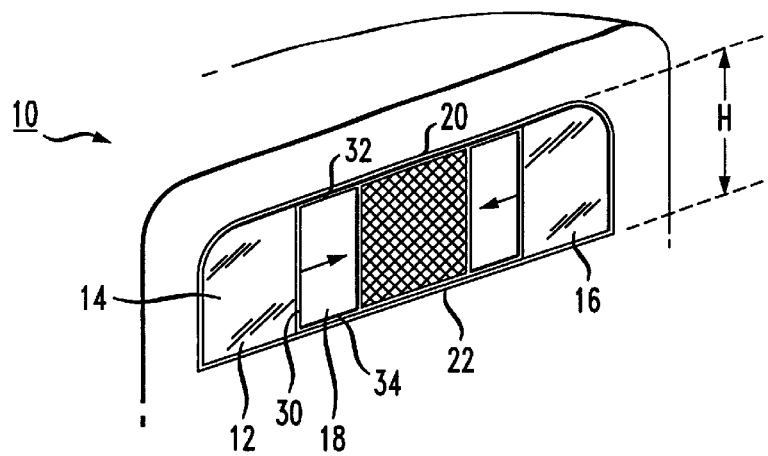
FIG. 1 is an isometric view of a vehicle rear window including a screen formed in accordance with the present invention.

An isometric view of a portion of a vehicle 10, such as a pick-up truck cab, including a laminate window screen 12 of the present invention, is shown in FIG. 1. Vehicle 10 includes, perhaps, a pair of fixed rear windows 14, 16, and at least one slidable rear window 18. As will be discussed below, slidable rear window 18 is disposed in a pair of channels included in top brace 20 and bottom brace 22, affording window 18 lateral movement, as indicated by the arrows in FIG. 1. When slidable window 18 is opened in a conventional truck while the truck is moving, the circulation of air between the truck bed and cab (not shown), results in debris from the bed being swept into the cab area.

In accordance with the present invention, a screen track 30, comprising an upper channel 32 and a lower channel 34, is used to capture a laminate window screen 12 formed in the manner described below. Upper channel track 32 and lower channel track 34 are affixed to braces 20 and 22 of the window structure of vehicle 10, respectively, and allows for slidable window 18 to be opened and prevent debris from entering the cab.

Figure 2:
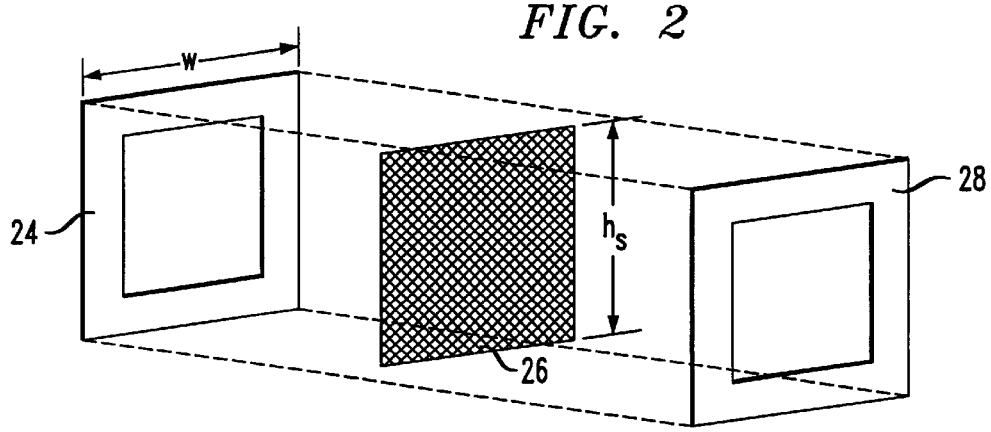
FIG. 2 is an exploded view of the laminate screen structure of the present invention.
Figure 3:
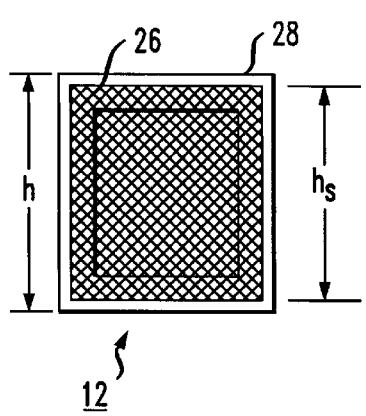
FIG. 3 is a front view of the laminate screen structure as shown in FIG. 2.

FIG. 2 illustrates, in an exploded view, the elements forming laminate window screen assembly 12 of the present invention. Particularly, laminate window screen 12 comprises a first, high strength plastic frame member 24, a screen element 26 and a second, high strength plastic frame member 28. High strength plastic frame members 24, 28 are formed to comprise a height h that corresponds to a conventional height H of vehicle rear windows (as depicted in FIG. 1). Screen element 26 comprises dimensions of height $h_s$ and width $w_s$ such that screen element 26 overlaps the interior periphery of frame members 24, 28. This overlap is critical to ensuring that a lamination process will completely seal screen element 26 with plastic high strength members 24,28. FIG. 3 is a front view of laminate window screen 12, illustrating the placement of screen element 26 within plastic high strength frame members 24, 2. This view particularly show the overlap of the screen edge with the inner periphery of frame members 24, 28.

Figure 4:
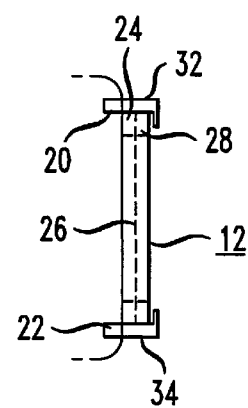
FIG. 4 is a side view of the arrangement of FIG. 1, illustrating the location of the rear window screen of the present invention.

In a preferred arrangement for attaching laminate window screen 12 to a vehicle, a double-sided adhesive, such as a tape, is attached upper and lower channels 32,34 of screen track assembly 30. Channels 32,34 are then disposed to abut braces 20 and 22. respectively, of the vehicle window assembly. As shown particularly in FIG. 4, laminate window screen 12 is disposed between channels 32, 34 and positioned on the exterior of the window assembly, so as to not interfere with the normal operation of the window, particularly with the operation of slidable window 18. Therefore, this window may be opened and closed without the need to remove laminate window screen 12 of the present invention. Advantageously, laminate window screen 12 can be moved to the right or left along upper and lower channels 32,34 to allow for the rear window to be completely opened and allow access to the cab area of the vehicle.

In an alternative embodiment, the vehicle manufacturer may provide an additional track on the window assembly such that the screen assembly of the present invention may be slidably mounted on this additional track and be capable of movement without interfering with the normal operation of the window. In this embodiment, the need is removed for an individual to install an additional window track.

Although there has been shown and described a preferred embodiment of the present invention, it will be readily apparent to those skilled in the art that modifications may be made thereto which do not exceed the scope of the appended claims. Therefore, the scope of the present invention is only to be limited by the following claims.

What is claimed is:

1. A vehicle rear window assembly including at least one stationary window and at least one slidable window for forming an opening, said at least one stationary window and at least one slidable window disposed within a structure including a top brace and bottom brace, defining a height H of said structure, said vehicle rear window assembly including a screen window assembly comprising a laminate screen window comprising a first high strength plastic frame member defined as comprising an inner periphery and an outer periphery;

a screen element disposed to overlap the inner periphery of said first high strength plastic frame member; and a second high strength plastic frame member disposed to cover said screen element, forming a laminate structure with said first plastic frame member and said screen element; and a screen window track permanently attached to the rear window assembly with a double-sided adhesive to support said laminate screen window in a slidable configuration on the top and bottom brace of said rear window assembly.

2. The rear window assembly as defined by claim 1 wherein the combination of the first plastic frame member, screen element and second plastic frame member are glued together to form a laminate structure with the screen element permanently fixed between said first and second frame members.

3. The rear window assembly as defined by claim 1 wherein the screen window track comprises an upper channel and a lower channel, the upper channel attached to the top brace of the window structure and the lower channel attached to the bottom brace of the window structure.

4. The rear window assembly as defined by claim 1 wherein the height h of the first plastic frame member is essentially identical to the height H of the rear window assembly.

* * * * *